United States Patent [19]

Osamura et al.

[11] Patent Number: 5,114,889
[45] Date of Patent: May 19, 1992

[54] SILICON NITRIDE SINTERED BODY AND PROCESS FOR PREPARATION THEREOF

[75] Inventors: Kazumi Osamura; Masaki Terazono; Shoji Kohsaka; Kazunori Koga; Akira Saito; Masahiro Sato; Hideki Uchimura, all of Kokubu, Japan

[73] Assignee: Kyocera Corporation, Kyoto, Japan

[21] Appl. No.: 618,480

[22] Filed: Nov. 27, 1990

[30] Foreign Application Priority Data

Nov. 27, 1989 [JP] Japan ................................ 1-308621
Nov. 30, 1989 [JP] Japan ................................ 1-312736
Mar. 13, 1990 [JP] Japan ................................ 2-61781

[51] Int. Cl.$^5$ ............................................. C04B 35/58
[52] U.S. Cl. ........................................ 501/97; 501/98; 264/65
[58] Field of Search ....................... 501/97, 98; 264/65

[56] References Cited

U.S. PATENT DOCUMENTS

| | | | |
|---|---|---|---|
| 4,102,698 | 7/1978 | Lange et al. | 501/98 |
| 4,256,688 | 3/1981 | Adlerhorn et al. | 264/332 |
| 4,383,958 | 5/1983 | Moschetti et al. | 501/98 |
| 4,401,768 | 8/1983 | Morgan | 501/98 |
| 4,449,989 | 5/1984 | Sarin et al. | 501/98 |
| 4,455,275 | 6/1984 | Alderhorn et al. | 264/332 |
| 4,457,958 | 7/1984 | Lange et al. | 501/98 |
| 4,652,276 | 3/1987 | Burden | 501/98 |
| 4,870,036 | 9/1989 | Yeh | 501/98 |

Primary Examiner—Mark L. Bell
Assistant Examiner—Deborah Jones
Attorney, Agent, or Firm—Spensley Horn Jubas & Lubitz

[57] ABSTRACT

Disclosed is a silicon nitride sintered body comprising 70 to 99 mole % of silicon nitride, 0.1 to 5 moles % of a rare earth element oxide and up to 25 moles % of silicon oxide and having a silicon oxide-to-rare earth element oxide molar ratio of from 2 to 25, wherein silicon nitride crystal grains have a fine acicular structure having an average particle major axis of up to 7 μm and an average aspect ratio of at least 3.

9 Claims, 2 Drawing Sheets

SILICON NITRIDE SINTERED BODY AND PROCESS FOR PREPARATION THEREOF

BACKGROUND OF THE INVENTION (1) Field of the Invention

The present invention relates to a silicon nitride sintered body excellent in the flexural strength and oxidation resistance at high temperatures, which is suitably used for a heat engine such as a gas turbine or a turbo rotor, and a process for the preparation thereof.

(2) Description of the Related Art

A silicon nitride sintered body is excellent in strength, hardness and thermochemical stability at high temperatures, and therefore, has attracted attention as engineering ceramics, especially as a material of a heat engine.

Since silicon nitride is difficult to sinter, in the production of a silicon nitride sintered body, in general, a sintering aid such as a rare earth element oxide is added, and the hot press method, the normal pressure firing method, the gas pressure firing method and the like are adopted. Recently, there is proposed a method of producing a sintered body having a high density and a high strength by forming an impermeable seal composed of a glass or the like on the surface of a molded body of silicon nitride having a desired composition and firing the molded body under a high pressure (hereinafter referred to as "seal HIP method").

For example, U.S. Pat. No. 4,102,698 to Lange et al. proposes a sintered ceramic composition of the $Si_3N_4$-$SiO_2$-$Y_2O_3$ system, and U.S. Pat. No. 4,234,343 to Anderson proposes a ceramic composition of the $Si_3N_4$-$SiO_2$-$M_2O_3$ system in which M represents a combination of a rare earth element with other element such as Al, Cr or Mg. If $Al_2O_3$ or MgO is contained in a sintered body, a low-melting-point substance is formed in the grant boundary of the sintered body and the high-temperature strength and the high-temperature oxidation resistance are degraded. Accordingly, from the viewpoint of the high-temperature characteristics of the sintered body, a ceramic composition of the simple ternary $Si_3N_4$-$RE_2O_3$ (rare earth element oxide)-$SiO_2$ system substantially free of the foregoing oxides is now examined.

From the viewpoint of the texture of the sintered body, the grain boundary phase in the sintered body attracts attention as the factor determining the high-temperature characteristics, and the trial is made to substantially crystallize the grain boundary phase for improving the strength of the grain boundary phase per se. Accordingly, there is recently adopted a method in which in a composition of the above-mentioned simple ternary system, the firing conditions are modified or the sintered body is heat-treated so that a crystal phase composed of the $Si_3N_4$-$RE_2O_3$ (rare earth element oxide)-$SiO_2$ system, such as apatite, YAM or wollastonite, is precipitated in the grain boundary.

However, although the crystallization of the grain boundary phase is effective to some extent for improving the high-temperature strength, it is very difficult to precipitate only a specific crystal phase stably in the grain boundary, and it sometimes happens that a low-melting-point glass phase other than the crystal phase is formed in the grain boundary to degrade the characteristics.

For example, if a crystal of the melilite structure is precipitated in the grain boundary phase, although reduction of the high-temperature strength in an inert atmosphere is not caused, in an oxidizing atmosphere which is a practical condition, the grain boundary phase is unstable and the strength is degraded with the change of the volume of the crystal phase. In the case where a crystal of the apatite, wollastonite or YAM structure is precipitated, the stability in an oxidizing atmosphere is slightly improved over the case where a crystal of the melilite structure is precipitated, but a static fatigue is caused during long-period use. As means for overcoming this disadvantage, there is recently proposed a sintered body in which a diopside structure and an apatite structure are precipitated in the grain boundary phase by adding $RE_2O_3$ (in which RE represents a rare earth element) and a metal oxide such as MgO to $Si_3N_4$ (see Japanese Unexamined Patent Publication No. 62-207765).

According to this technique, degradation of the strength, such as static fatigue, is small even if the sintered body is placed in an oxidizing atmosphere for a long time, but since a metal oxide need to be added in addition to $RE_2O_3$, the melting point of the liquid phase necessary for sintering is low and hence, the strength at 1400° C. is drastically degraded.

SUMMARY OF THE INVENTION

It is a primary object of the present invention to provide a silicon nitride sintered body which has an excellent stability in an oxidizing atmosphere, has a high room-temperature strength, does not show static fatigue during long-period use and has a high flexural strength in a high-temperature atmosphere maintained at 1400° C., and a process for the preparation of this sintered body.

Another object of the present invention is to provide a silicon nitride sintered body having an excellent toughness in addition to the above-mentioned characteristics and a process for the preparation of this sintered body.

Still another object of the present invention is to provide a silicon nitride sintered body in which the above-mentioned characteristics are always obtained stably and which is excellent in the adaptability to the mass production conducted on an industrial scale.

In accordance with one fundamental aspect of the present invention, there is provided a silicon nitride sintered body comprising 70 to 99 mole% of silicon nitride, 0.1 to 5 mole% of a rare earth element oxide and up to 25 mole% of silicon oxide and having a silicon oxide-to-rare earth element oxide molar ratio of from 2 to 25, wherein silicon nitride crystal grains have a fine acicular structure having an average particle major axis of up to 7 μm and an average aspect ratio of at least 3.

In accordance with another aspect of the present invention, there is provided a process for the preparation of a silicon nitride sintered body having improved strength and toughness, which comprises molding into a predetermined shape a composition comprising 70 to 99 mole% of silicon nitride composed mainly of $\alpha$-$Si_3N_4$, 0.1 to 5 mole% of a rare earth element oxide and up to 25 mole% of silicon oxide and having a silicon oxide-to-rare earth element oxide molar ratio of from 2 to 25, coating the surface of the molded body with a glass powder capable of forming a gas-impermeable seal, heating the coated molded body to form an impermeable glass seal on the surface of the molded body, compressing the obtained glass-sealed molded body under such conditions the majority of the silicon nitride in the molded body is left in the form of α-Si$_3$N$_4$, to density the molded body, and maintaining the densified molded body at a temperature of 1450° to 1730° C. to convert the silicon nitride in the molded body to β-Si$_3$N$_4$.

DETAILED DESCRIPTION OF THE PREFERRED EMBODIMENTS

The silicon nitride sintered body of the present invention is prominently characterized in that the sintered body has a chemical composition comprising 70 to 99 mole%, especially 80 to 93.5 mole%, of silicon nitride, 0.1 to 5 mole%, especially 0.5 to 3 mole%, of a rare earth element oxide and up to 25 mole%, especially 6 to 20 mole%, of excessive oxygen as calculated as SiO$_2$ and having an excessive oxygen/rare earth element oxide molar ratio of from 2 to 25, though the chemical composition differs to some extent according to the chemical structure of the grain boundary phase described hereinafter, and the crystal phase of silicon nitride has an acicular structure having an aspect ratio of at least 3 and an average grain size (average major axis) of up to 7 μm.

In the instant specification, excessive oxygen means the quantity of oxygen calculated by subtracting the amount of oxygen stoichiometrically incorporated as the rare earth element oxide (RE$_2$O$_3$) from the total amount of oxygen contained in the entire system of the sintered body. More specifically, excessive oxygen consists of oxygen contained as an impurity in the starting silicon nitride material and oxygen added as SiO$_2$. In the instant specification, the amount of this excessive oxygen is expressed by the amount as calculated as SiO$_2$.

One of the characteristic features of the composition of the sintered body of the present invention is that the excessive oxygen/rare earth element oxide molar ratio is in the range of from 2 to 25, especially from 3 to 20. The reason why this molar ratio is limited within the above-mentioned range is that if this molar ratio is lower than 2, the oxidation resistance at high temperatures is degraded and if the molar ratio exceeds 25, a low-melting-point glass is readily formed and high-temperature characteristics are degraded. If any one of the amounts of silicon nitride, the rare earth element oxide and excessive oxygen is outside the above-mentioned range, the room temperature strength and high-temperature strength are degraded and the intended objects of the present invention cannot be attained.

The entire composition of the silicon nitride sintered body has influences on the texture of the sintered body, especially the composition of the grain boundary phase.

Systematically, the silicon nitride sintered body comprises, in general, the main crystal phase composed of silicon nitride and the grain boundary phase composed of, for example, the rare earth element oxide, SiO$_2$ and silicon nitride. For improving the high-temperature characteristics, trials have been made to improve the grain boundary phase, and especially, there have been tried a method in which the grain boundary phase is formed of a high-melting-point glass, and a method in which the grain boundary phase per se is eliminated and the grain boundary phase is formed of a high-melting-point crystalline texture. The crystal of the Si$_3$N$_4$-RE$_2$O$_3$-SiO$_2$ system has attracted attention in the conventional technique of crystallizing the grain boundary phase. In general, however, if SiO$_2$ is present in a large quantity, the melting point of the grain boundary drops and the high-temperature strength is reduced. Therefore, the sintered body can be used only at temperatures lower than 1000° C. Accordingly, reduction of the amount of SiO$_2$ has been intended.

Contrary to these conventional ideas, according to the present invention, it has been found that even in case of a composition where SiO$_2$ is excessive, if specific molar ratios are maintained among the respective ingredients, a sintered body having an excellent high-temperature strength and excellent static characteristics can be obtained.

In a preferred example of the silicon nitride sintered body of the present invention, a crystal phase of silicon oxynitride (Si$_2$N$_2$O) is present in the above-mentioned grain boundary phase. This Si$_2$N$_2$O crystal phase may be present singly or in combination with a glass phase. From the viewpoint of the high-temperature strength, it is especially preferred that a crystal phase of silicon oxynitride (Si$_2$N$_2$O) and a crystal phase of a disilicate (RE$_2$O$_3$.2SiO$_2$) be present in combination in the crystal grain boundary of silicon nitride.

Figure 2:
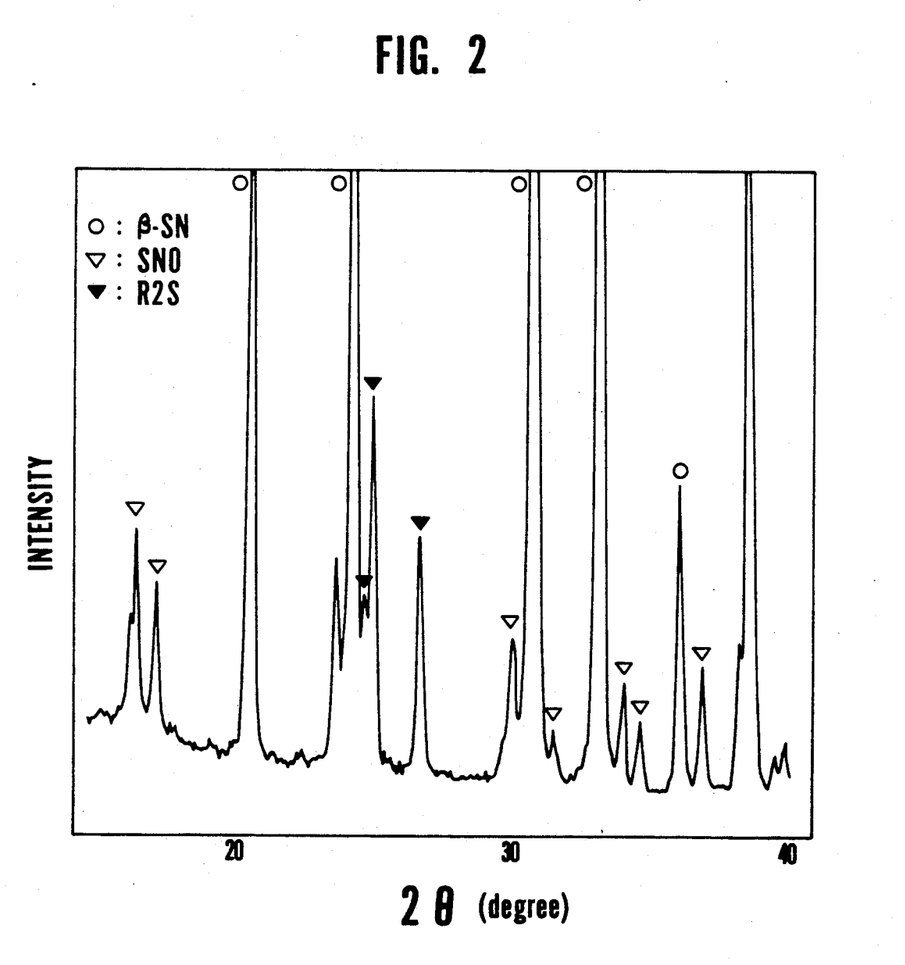
FIG. 2 is an X-ray diffraction chart of one example of the silicon nitride sintered body of the present invention.

FIG. 2 of the accompanying drawings shows an X-ray diffraction pattern of an example of the silicon nitride sintered body of the present invention, which indicates that a disilicate (R2S) is formed in the grain boundary of silicon oxynitride (SNO) and β-silicon nitride (β-SN).

For forming the above-mentioned crystal phase in the grain boundary, the selection and combination of the above-mentioned molar ratios and the heat treatment described hereinafter are very important.

If the above-mentioned SiO$_2$/RE$_2$O molar ratio is lower than 2, melilite, apatite, YAM and wollastonite are readily precipitated in the crystal phase of the grain boundary, and the stability in an oxidizing atmosphere is degraded and the static fatigue becomes conspicuous when the sintered body is placed in an oxidizing atmosphere for a long time. If the SiO$_2$/RE$_2$O$_3$ molar ratio exceeds 25, SiO$_2$ becomes excessive, and the grain boundary phase is composed solely of a glass and a dense sintered body having a high strength and a high heat resistance cannot be obtained.

According to the present invention, in the above-mentioned specific composition, by imparting an acicular structure having an average aspect ratio of at least 3, especially at least 5, and an average particle size (major axis) of up to 7μm, especially up to 6, to silicon nitride crystal grains in the sintered body, the toughness of the sintered body can be drastically improved while the above-mentioned strength and oxidation resistance are maintained. If the average aspect ratio is lower than 3, the desired toughness cannot be obtained, and if the average particle size exceeds 7 μm, the room temperature strength and high-temperature strength are degraded.

In a preferred example of the sintered body of the present invention, the content of iron (Fe) in the sintered body is controlled below 50 ppm, especially below 30 ppm, and excellent oxidation resistance, room temperature strength, high-temperature strength and toughness can always be obtained stably with a good reproducibility. The reason is presumed to be as follows. If the above-mentioned components are subjected to high-temperature firing, for example, gas pressure firing, a liquid phase having a low viscosity is formed by the assistant component and sintering is advanced. At this point, impurity metals present in the sintered body are dispersed substantially in the grain boundary having a low viscosity. Accordingly, it is considered that the characteristics are hardly influenced by the impurity metals. However, if the above composition is subjected to low-temperature firing by hot hydrostatic pressure firing or the like, a liquid phase is formed by the assistant component during the sintering, but the sintering is advanced in the state where the viscosity of the liquid phase is maintained at a high level. At this point, if impurity metals such as iron are present in the grain boundary, a low-melting-point substance is formed by the reaction with the assistant or the like, and since the viscosity of the grain boundary per se is high, only the formed low-melting-point substance moves in the grain boundary and is aggregated. In this aggregated portion, the grain abnormally grow and it is construed that these abnormally grown grains act as the destruction source. It is considered that if the iron content is reduced to the above range, this abnormal growth of grains is inhibited and the above-mentioned excellent characteristics can be stably obtained.

As the rare earth element oxide ($RE_2O_3$) used in the present invention, there can be mentioned $Y_2O_3$ and oxides of lanthanide rare earth elements, and in view of the homogeneity and strength of the sintered body, $Yb_2O_3$, $Er_2O_3$, $Ho_2O_3$ and $Dy_2O_3$ are preferably used.

Various processes can be adopted for the production of the silicon nitride sintered body having the above-mentioned structure, but the seal HIP process is preferably adopted for obtaining excellent characteristics. Accordingly, the seal HIP process will now be described by way of example.

Silicon nitride powder, rare earth element oxide powder and, if necessary, $SiO_2$ powder are used as the starting powder. In order to enhance the sintering property, it is preferred that the silicon nitride powder should have a BET specific surface area of 3 to 20 $m^2/g$ and an $\alpha$-structure ratio of at least 95%. The total oxygen content is about 0.8 to about 1.4% by weight in a commercially available product, but the total oxygen content can be optionally adjusted by addition of $SiO_2$. For removing the iron component from the starting silicon nitride, the starting silicon nitride is washed with an acid such as hydrochloric acid or nitric acid so that the iron content is reduced to the above-mentioned level.

These powders were weighed and mixed so that the above-mentioned composition was obtained, and a binder is added to the mixed powder and the mixture is granulated and molded. The molding can be performed according to known methods. For example, press molding, extrusion molding, cast molding and injection molding methods can be adopted.

The binder is removed from the molded body, and a powder having a poor wettability with the glass, such as boron nitride (BN) powder, is coated on the surface of the molded body so as to prevent reaction with the glass or the like as the sealing material at the firing step. The coating of the powder having a poor wettability with the glass, such as BN powder, on the surface of the molded body is accomplished by coating or spraying a slurry of the BN powder or the like on the surface of the molded body. The amount coated of the BN powder or the like is preferably such that the thickness of the coating layer is about 1 to about 10 mm.

After the coating with the BN powder or the like, drying should be performed, and cracking is readily caused at this drying step. Accordingly, it is preferred that before the coating with BN or the like, the molded body be once calcined in an inert gas atmosphere at 1200° to 1600° C.

Impurities such as $B_2O_3$ are present in the BN powder, and at the sintering step, these impurities are incorporated into the sintered body to form a grain boundary having a low melting point and degrade the high-temperature characteristics. Accordingly, it is preferred that before the firing, the heat treatment be carried out under a reduced pressure at 1200 to 1450° C. to remove these impurities. It is necessary that this heat treatment should be carried out under such conditions as not causing decomposition of silicon nitride.

A glass powder for forming a seal at the firing is coated on the surface of the BN-coated molded body, or the BN-coated molded body is sealed in a glass capsule. As another method, there can be adopted a method in which the molded body is embedded in a heat-resistant vessel in which a glass powder is filled. Then, the molded method is fired under high-temperature and high-pressure conditions according to the HIP process.

Figure 1:
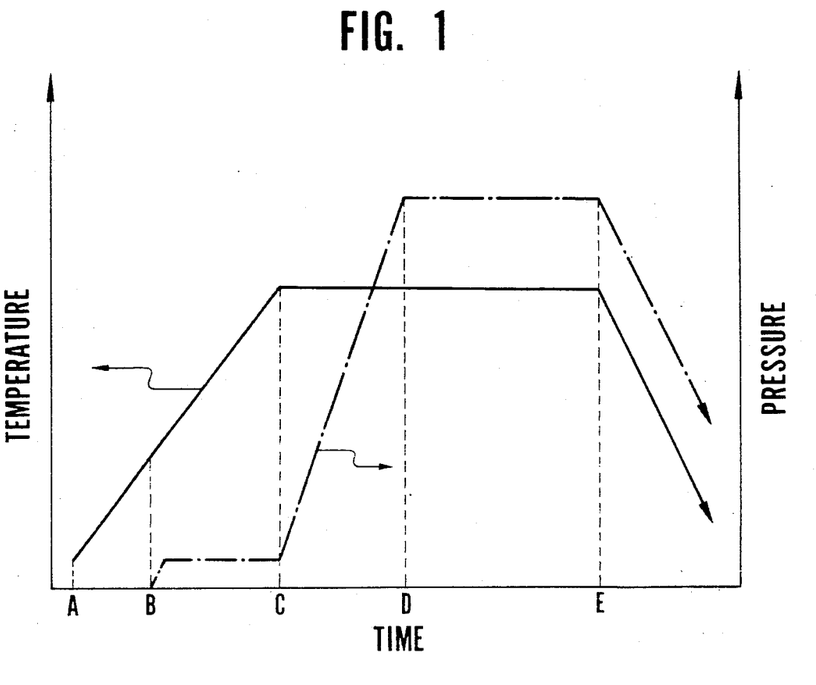
FIG. 1 is a graph illustrating one example of the sintering condition for obtaining the silicon nitride sintered body of the present invention.

FIG. 1 shows a specific firing pattern for obtaining the sintered body of the present invention. Referring to FIG. 1, along line segment A-B, the temperature in the furnace is elevated under a reduced pressure to remove water contained in the molded body.

Then, along line segment B-C, the temperature is elevated to a firing temperature higher than the softening point of the glass present on the surface of the molded body, and simultaneously, a nitrogen gas having a partial pressure almost equal to the decomposition equilibrium pressure of silicon nitride at said temperature or a partial pressure of about 0.01 to 0.2 MPa is introduced to soften the glass and form a gas-impermeable film of the glass on the surface of the molded body.

After the gas-impermeable film has been completely formed on the surface of the molded body, the pressure in the furnace is elevated along line segment C-D to a level effecting sufficient densification, for example, at least 50 MPa. An inert gas such as nitrogen or argon is used as the pressure medium. At this stage, a liquid phase is formed by the rare earth element oxide, $SiO_2$ and silicon nitride and firing is advanced. Densification is substantially completed at point D.

Then, along line segment D-E, the molded body is maintained at a maximum temperature under a maximum pressure for a predetermined time to grow the crystal. After point E, both of the temperature and pressure are dropped and the firing is terminated.

In the present invention, in order to obtain a sintered body having the above-mentioned excellent characteristics, a large quantity of $\alpha$-$Si_3N_4$ is left in the sintered body, for example, at point D where the densification is substantially completed, and this state is maintained for a predetermined time to produce an acicular structure in silicon nitride. In general, the formation of the acicular structure at the liquid phase-producing temperature incidentally to the transfer to $\beta$-$Si_3N_4$ from $\alpha$-$Si_3N_4$. However, if the $\alpha$-$\beta$ transfer is advanced excessively along line segment C-D, a state similar to the state brought about by the use of a starting material having a high $\beta$-$Si_3N_4$ content is about, and the attainment of the effect of forming the intended acicular structure is inhibited.

By increasing the presssure-elevating rate along line segment C-D to a level of at least 50 MPa/hr, the content of $\alpha$-$Si_3N_4$ in the sintered body at point D can be increased.

The reason why the firing conditions at the HIP treatment are limited to a firing temperature of 1450° to 1730° C., especially 1500° to 1700° C., and a pressure of at least 50 MPa, especially at least 100 MPa, is that if these requirements are satisfied, a fine acicular structure can be formed effectively.

If the temperature is lower than 1450° C., densification cannot be attained, and if the temperature is higher than 1730° C., silicon nitride particles grow excessively and no fine structure is obtained, and no improvement of the mechanical characteristics can be expected. The pressure is an indispensable factor for densification by the low-temperature firing, and if the pressure is lower than 50 MPa, a densified body cannot be obtained. In the region of line segment D-E, the sintered body is maintained for a time enough to advance formation of the acicular structure sufficiently, more specifically for 1 to 5 hours. The cooling rate from point E is preferably 500° to 1500° C./hr.

The so-obtained sintered body comprises an acicular $\beta$-silicon nitride crystal phase and, according to circumstances, a small amount of an $\alpha$-silicon nitride crystal phase, and silicon, rare earth element, oxygen and nitrogen are present in the grain boundaries of these crystal phases. Furthermore, according to the above-mentioned process, a crystal phase of silicon oxynitride represented as $Si_2N_2O$ and a crystal phase of a disilicate represented by $RE_2O_3.2SiO_2$ (RE represents a rare earth element) are formed.

In the silicon nitride sintered body of the present invention, growth of acicular particles of silicon nitride is controlled within the above-mentioned range and simultaneously, the above-mentioned crystal phases are formed in the grain boundaries. This also is a prominent structural characteristic feature of the sintered body of the present invention.

The sintered body obtained according to the above-mentioned process is heat-treated at 1200° to 1700° C., especially 1300° to 1600° C., in an oxidizing atmosphere or a non-oxidizing atmosphere such as a nitrogen atmosphere for about 3 to about 100 hours, whereby crystallization of the grain boundary is further advanced and a silicon oxynitride phase or a silicon oxynitride phase and a disilicate phase can be precipitated in the grain boundary.

According to the present invention, a silicon nitride sintered body having a flexural strength of at least 1000 MPa at room temperature and a flexural strength of at least 800 MPa at 1200° C. is obtained. This sintered body has an excellent oxidation resistance, and the increase of the weight by oxidation at 1400° C. is smaller than 0.1 mg/cm$^2$.

Therefore, the silicon nitride sintered body of the present invention is valuably used as a high-temperature construction material for a heat engine or the like, or as various structural machine parts.

The present invention will now be described in detail with reference to the following examples that by no means limit the scope of the invention.

EXAMPLE 1

A silicon nitride powder (having a BET specific surface area of 5 m$^2$/g, an $\alpha$-structure ratio of 99% and an impurity oxygen amount of 1.0% by weight), a rare earth element oxide powder and an $SiO_2$ powder were mixed as the starting powders so that a composition shown in Table 1 was obtained, and the mixture was press-molded and calcined at 1400° C.

A paste of a BN powder having a particle size of 1 to 5$\mu$um was coated in a thickness of 1 to 10 mm on the obtained molded body, and the molded body was heat-treated at 1350° C. under 0.2 Torr to remove impurities.

Then, a glass composed mainly of $SiO_2$ was coated in a thickness of 1 to 10 mm on the molded body.

The so-treated molded body was placed in a hot isostatic pressure firing furnace and was fired according to the firing pattern shown in FIG. 1. Namely, at first, water was removed at 500° C. under reduced pressure, and in an atmosphere of nitrogen having a pressure of 0.1 MPa, the temperature in the furnace was elevated to a level higher than the softening point of the glass and then, the temperature was elevated at a firing temperature shown in Table 1 at a temperature-elevating rate of about 900° C./hr. After the formation of a glass seal on the surface of the molded body was confirmed, the pressure was elevated at a pressure-elevating rate shown in Table 1 by using Ar as the pressure medium and firing was carried out under predetermined conditions. After the firing, the obtained sintered body was cooled at a cooling rate of 1000° C./hr.

After removal of the glass, with respect to the obtained sintered body, the flexural strength at room temperature, 1200° C. and 1400° C. was measured according to the 4-point bending method of JIS R-1601, and $K_{1c}$ was measured according to the IM method. Furthermore, the increase of the weight by oxidation at 1400° C. was examined.

From the mirror surface photo of each sintered body, the average aspect ratio and average particle size (major axis) of silicon nitride crystal grains were measured.

The obtained results are shown in Table 1.

From the data shown in Table 1, the following can be seen.

In samples 9 and 14 where the excessive oxygen/rare earth element oxide molar ratio was lower than 2, the room temperature strength and the strength at 1400° C. were low. In sample 5 where the above-mentioned molar ratio was higher than 25, the strength was low. In sample 10 where the firing temperature was set at a high level, abnormal growth of grains was caused and the strength was low.

In samples 11 and 15 where the pressure-elevating rate at the firing was set at a low level, the aspect ratio was small and no effect of improving the toughness was attained.

In contrast to these comparative samples, each of the samples according to the present invention had a small particle size, a large aspect ratio, a flexural strength of at least 1100 MPa, an excellent toughness of at least 6.0 MPa.ml$^{\frac{1}{2}}$ and such an excellent oxidation resistance at a high temperature that the increase of the weight by oxidation at 1400° C. was smaller than 0.1 mg/cm$^2$.

TABLE 1

| Composition* (mole %) | Firing Condition |
| --- | --- |

TABLE 1-continued

| Sample No. | $Si_3N_4$ | excessive oxygen | $RE_2O_3$ | Excessive Oxygen /$RE_2O_3$ | temperature (°C.) | pressure (MPa) | time (Hr) | elevation speed (MPa/Hr) |
|---|---|---|---|---|---|---|---|---|
| 1 | 92 | 7.0 | $Er_2O_3$ 1.0 | 7.0 | 1700 | 196 | 1 | 90 |
| 2 | 88 | 11.0 | $Er_2O_3$ 1.0 | 11.0 | 1700 | 196 | 1 | 90 |
| 3 | 84 | 15.0 | $Er_2O_3$ 1.0 | 15.0 | 1700 | 196 | 1 | 90 |
| 4 | 79 | 20.0 | $Er_2O_3$ 1.0 | 20.0 | 1700 | 196 | 1 | 90 |
| 5 | 69 | 30.0 | $Er_2O_3$ 1.0 | 30.0 | 1700 | 196 | 1 | 90 |
| 6 | 90 | 7.0 | $Er_2O_3$ 3.0 | 2.5 | 1700 | 196 | 1 | 90 |
| 7 | 88 | 9.0 | $Er_2O_3$ 3.0 | 3.0 | 1700 | 196 | 1 | 90 |
| 8 | 85 | 12.0 | $Er_2O_3$ 3.0 | 4.0 | 1700 | 196 | 1 | 90 |
| 9 | 87 | 8.0 | $Er_2O_3$ 5.0 | 1.6 | 1700 | 196 | 1 | 90 |
| 10 | 90 | 7.0 | $Er_2O_3$ 3.0 | 2.5 | 1850 | 196 | 1 | 90 |
| 11 | 92 | 7.0 | $Er_2O_3$ 1.0 | 7.0 | 1750 | 196 | 1 | 25 |
| 12 | 92 | 7.0 | $Yb_2O_3$ 1.0 | 7.0 | 1700 | 196 | 1 | 90 |
| 13 | 90 | 7.0 | $Yb_2O_3$ 3.0 | 2.5 | 1700 | 196 | 1 | 90 |
| 14 | 87 | 8.0 | $Yb_2O_3$ 5.0 | 1.6 | 1700 | 196 | 1 | 90 |
| 15 | 92 | 7.0 | $Yb_2O_3$ 1.0 | 7.0 | 1750 | 196 | 1 | 25 |
| 16 | 85 | 12.0 | $Dy_2O_3$ 3.0 | 4.0 | 1700 | 196 | 1 | 90 |
| 17 | 85 | 12.0 | $Ho_2O_3$ 3.0 | 4.0 | 1700 | 196 | 1 | 90 |

| Sample No. | Flexural Strength(MPa) room temperature | 1200° C. | 1400° C. | Increase of Weight by Oxydation(mg/cm$^2$) | Average Particle Size of $Si_3N_4$(μm) | Aspect Ratio | $K_{1c}$ (MPa·m$^{\frac{1}{2}}$) |
|---|---|---|---|---|---|---|---|
| 1 | 1200 | 850 | 650 | 0.09 | 4 | 5 | 6.8 |
| 2 | 1230 | 1000 | 750 | 0.08 | 4 | 5 | 6.9 |
| 3 | 1200 | 950 | 650 | 0.08 | 4 | 5 | 6.8 |
| 4 | 1220 | 970 | 610 | 0.09 | 5 | 5 | 7.0 |
| 5 | 1110 | 650 | 500 | 0.09 | 4 | 4 | 6.8 |
| 6 | 1100 | 870 | 630 | 0.09 | 7 | 5 | 7.0 |
| 7 | 1120 | 890 | 640 | 0.09 | 7 | 5 | 6.9 |
| 8 | 1110 | 910 | 620 | 0.08 | 7 | 5 | 7.0 |
| 9 | 700 | 650 | 470 | 0.18 | 16 | 6 | 7.1 |
| 10 | 900 | 700 | 450 | 0.10 | 16 | 6 | 7.0 |
| 11 | 1000 | 750 | 470 | 0.10 | 6 | 2.5 | 4.5 |
| 12 | 1150 | 830 | 640 | 0.08 | 6 | 6 | 7.2 |
| 13 | 1100 | 810 | 620 | 0.08 | 7 | 6.5 | 7.2 |
| 14 | 850 | 640 | 500 | 0.15 | 17 | 6 | 7.2 |
| 15 | 970 | 740 | 460 | 0.09 | 5 | 2.5 | 4.6 |
| 16 | 1100 | 900 | 610 | 0.10 | 7 | 5 | 7.0 |
| 17 | 1100 | 910 | 620 | 0.10 | 7 | 5 | 6.9 |

Note *excessive oxygen expressed as $SiO_2$

EXAMPLE 2

A silicon nitride powder (having a BET specific surface area of 17 m$^2$/g, an α-structure ratio of 93% and an impurity oxygen amount of 0.9% by weight), a rare earth element oxide powder and an $SiO_2$ powder were mixed as the starting powders so that a composition shown in Table 2 was obtained, and the mixture was press-molded under 1 g/cm$^2$.

A BN powder was coated in a thickness of 1 to 10 mm on the obtained molded body, and a glass was further coated in a thickness of 5 to 10 mm.

The treated molded body was placed in a hot isostatic pressure furnace and the temperature was elevated to 1700° C. in an $N_2$ gas atmosphere under a pressure of 1 atmosphere. After the glass on the surface of the molded body was fused, firing was carried out at 1700° C. under 1500 atmospheres for 1 hour.

With respect to the obtained sintered body, the strength at room temperature, 1200° C. and 1400° C. was measured according to the 4-point bending test method, and the toughness at fracture was determined.

The crystal phase of the grain boundary of the sintered body was determined by the X-ray diffractometry.

For examining the oxidation resistance, the sintered body was maintaining in open air at 1000° C. for 100 hours and at 1400° C. for 24 hours, and the increase of the weight by oxidation was determined. Furthermore, after cooling, the room temperature strength was measured according to the above-mentioned method.

The obtained results are shown in Table 2.

TABLE 2

| Sample No. | Composition after Sintering (% by weight) (parenthesized value indicates mole %) | | | $SiO_2$ $RE_2O_3$ Weight Ratio (Parenthesized value indicates molar ratio) | Flexural Strength (Kg/mm$^2$) | | | Grain Boundary* | Toughness at Fracture (MPa·m$^{\frac{1}{2}}$) | Oxidation Resistance Test | | | |
|---|---|---|---|---|---|---|---|---|---|---|---|---|---|
| | | | | | | | | | | 1000° C. × 100 hrs. | | 1400° C. × 24 hrs. | |
| | $Si_3N_4$ | $SiO_2$ | $RE_2O_3$ | | R.T | 1200 °C. | 1400 °C. | | | amount increase (mg/cm$^2$) | strength (Kg/mm$^2$) | amount increase (mg/cm$^2$) | strength (Kg/mm$^2$) |
| 1 | 92 (87.8) | 5 (11.1) | $Er_2O_3$ 3 (1.1) | 1.67 (10) | 100 | 88 | 62 | S/G | 6.1 | 0.01 | 108 | 0.09 | 102 |
| 2 | 90 (83.8) | 7 (15.2) | $Yb_2O_3$ 3 (1.0) | 2.33 (15.2) | 108 | 82 | 51 | S/G | 6.2 | 0.03 | 100 | 0.08 | 98 |
| 3 | 87.5 (79.0) | 9.5 (20.0) | $Er_2O_3$ 3 | 3.17 (20.0) | 101 | 84 | 48 | S/G | 5.9 | 0.01 | 99 | 0.09 | 93 |

TABLE 2-continued

| Sample No. | Composition after Sintering (% by weight) (parenthesized value indicates mole %) | | | $SiO_2 RE_2O_3$ Weight Ratio (Parenthesized value indicates molar ratio) | Flexural Strength $(Kg/mm^2)$ | | | Grain Boundary* | Toughness at Fracture $(MPa \cdot m^{\frac{1}{2}})$ | Oxidation Resistance Test | | | |
|---|---|---|---|---|---|---|---|---|---|---|---|---|---|
| | | | | | | | | | | 1000° C. × 100 hrs. | | 1400° C. × 24 hrs. | |
| | $Si_3N_4$ | $SiO_2$ | $RE_2O_3$ | | R.T | 1200 °C. | 1400 °C. | | | amount increase $(mg/cm^2)$ | strength $(Kg/mm^2)$ | amount increase $(mg/cm^2)$ | strength $(Kg/mm^2)$ |
| | | | | (1.0) | | | | | | | | | |

Note *:
S = silicon oxynitride
G = glass

EXAMPLE 3

The same starting powders as used in Example 2 were mixed so that the composition of sample 1 of Example 1 was obtained, and the mixture was press-molded under 1 t/cm².

A glass was coated on the obtained molded body in the same manner as described in Example 2, and the temperature was elevated in an $N_2$ atmosphere under a pressure of 1 atmosphere to fuse the glass. Firing was carried out at 1650° C., 1700° C., 1750° C., 1800° C. or 1850° C. under 2000 atmospheres for 1 hour.

With respect to the obtained sintered body, the characteristics were evaluated in the same manner as described in Example 2.

The obtained results are shown in Table 3.

From the results shown in Table 3, it is seen that if the firing was carried out at a temperature higher than 1750° C., the room temperature flexural strength and high-temperature strength were degraded. The reason is considered to be that this reduction was due to the growth of grains.

EXAMPLE 4

A silicon nitride powder (having a BET specific surface area of 5 m²/g, an α-structure ratio of 95% and an impurity oxygen amount of 1.0% by weight), a rare earth element oxide powder and an $SiO_2$ powder were mixed as the starting powders so that a composition shown in Table 4 was obtained, and the mixture was press-molded under 1 t/cm² and calcined at 1400° C.

A paste of a BN powder having a particle size of 1 to 5 μm was coated in a thickness of 1 to 10 mm on the obtained molded body, and a glass composed mainly of $SiO_2$ was further coated in a thickness of 1 to 10 mm.

The treated molded body was placed in a hot isostatic pressure firing furnace and firing was carried out under conditions shown in Table 4. Thus, several kinds of samples differing in the characteristics, as shown in Table 4, were obtained.

These samples were heat-treated under conditions shown in Table 4.

With respect to each of the heat-treated sintered bodies, according to JIS R-1601, the 4-point bending strength at room temperature and 1400° C. was measured, and the oxidation resistance test was carried out at 1500° C. for 24 hours and the increase of the weight by oxidation after the test was measured.

Crystal phases other than that of silicon nitride were determined from the X-ray diffraction curve of the heat-treated sintered body.

The obtained results are shown in Table 4.

TABLE 3

| Sample No. | Composition after Sintering (% by weight) | | | $SiO_2/Er_2O_3$ Weight Ratio | Firing Temperature (°C.) | Flexural Strength $(Kg/mm^2)$ | | | Grain Boundary* | Toughness at Fracture $(MPa \cdot m^{\frac{1}{2}})$ |
|---|---|---|---|---|---|---|---|---|---|---|
| | $Si_3N_4$ | $SiO_2$ | $Er_2O_3$ | | | R.T | 1200 °C. | 1400 °C. | | |
| 1 | 92 (87.8) | 5 (11.1) | 3 (1.1) | 1.67 | 1650 | 117 | 96 | 68 | S/G | 6.5 |
| 2 | 92 (") | 5 (") | 3 (") | 1.67 | 1700 | 118 | 86 | 64 | S/G | 7.1 |
| 3 | 92 | 5 | 3 | 1.67 | 1750 | 115 | 86 | 60 | S/G | 6.5 |
| 4 | 92 | 5 | 3 | 1.67 | 1800 | 101 | 84 | 49 | S/G | 6.2 |
| 5 | 92 | 5 | 3 | 1.67 | 1850 | 94 | 82 | 46 | D/S | 5.9 |

Note *:
Si = silicon Oxynitride
D = diopside
G = glass

TABLE 4

| Sample No. | Composition (mole %) | | | Excessive Oxygen/ $RE_2O_3$ Molar Ratio | Firing Condition | | |
|---|---|---|---|---|---|---|---|
| | $Si_3N_4$ | $RE_2O_3$ | excessive oxygen[1] | | temperature (°C.) | Pressure (atm) | time (Hr) |
| 1 | 88 | $Er_2O_3$ 1.0 | 11.0 | 11 | 1700 | 196 | 1 |
| 2 | 88 | $Er_2O_3$ 1.0 | 11.0 | 11 | 1700 | 196 | 1 |
| 3 | 88 | $Er_2O_3$ 1.0 | 11.0 | 11 | 1700 | 196 | 1 |
| 4 | 86 | $Er_2O_3$ 2.0 | 12.0 | 6 | 1700 | 196 | 1 |
| 5 | 88 | $Yb_2O_3$ 1.0 | 11.0 | 11 | 1700 | 196 | 1 |
| 6 | 88 | $Ho_2O_3$ 1.0 | 11.0 | 11 | 1700 | 196 | 1 |
| 7 | 88 | $Er_2O_3$ 1.0 | 11.0 | 11 | 1700 | 196 | 1 |
| 8 | 88 | $Er_2O_3$ 1.0 | 11.0 | 11 | 1700 | 196 | 1 |
| 9 | 88 | $Er_2O_3$ 1.0 | 11.0 | 11 | 1700 | 196 | 1 |
| 10 | 92 | $Er_2O_3$ 3.0 | 5.0 | 1.6 | 1700 | 196 | 1 |
| 11 | 92 | $Er_2O_3$ 3.0 | 5.0 | 1.6 | 1700 | 196 | 1 |

TABLE 4-continued

| 12 | 89 | Er$_2$O$_3$ 1.0 | 10.0 | 10 | 1900 | 50 | 3 |
| 13 | 88 | Er$_2$O$_3$ 2.0 | 10.0 | 5 | 1900 | 50 | 3 |

| Sample No. | Heat Treatment Conditions temperature (°C.) | time (Hr) | atmosphere | Flexural Strength at 1400° C. (MPa) | Amount Increase by Oxidation at 1500° C. for 24 Hr (mg/cm$^2$) | Crystal Phase of Grain Boundary[2] | Average Crystal Grain Size (μm) |
| --- | --- | --- | --- | --- | --- | --- | --- |
| 1 | 1500 | 24 | N$_2$ | 740 | 0.08 | SNO, R2S | 4 |
| 2 | 1400 | 24 | air | 730 | 0.07 | SNO, R2S | 4 |
| 3 | 1400 | 100 | air | 710 | 0.08 | SNO, R2S | 4 |
| 4 | 1400 | 24 | air | 740 | 0.10 | SNO, R2S | 5 |
| 5 | 1400 | 24 | air | 720 | 0.08 | SNO, R2S | 4 |
| 6 | 1400 | 24 | air | 730 | 0.07 | SNO, R2S | 4 |
| 7 | — | — | — | 670 | 0.08 | SNO | 4 |
| 8 | 1200 | 24 | air | 660 | 0.08 | SNO | 4 |
| 9 | 1700 | 24 | N$_2$ | 470 | 0.10 | SNO, R2S, APT | 6 |
| 10 | — | — | — | 570 | 0.27 | -----(glass) | 5 |
| 11 | 1400 | 24 | air | 580 | 0.28 | Y | 5 |
| 12 | 1500 | 24 | N$_2$ | 610 | 0.10 | SNO, R2S | 8 |
| 13 | 1400 | 24 | air | 630 | 0.12 | SNO, R2S | 9 |

Note
[1]amount of oxy excessive oxygen is amount calculated as SiO$_2$
[2]SNO = silicon oxyditride, R2S = disilicate, Y = YAM, APT = apatite From the results shown in Table 4, it is seen that if a silicon nitride phase, especially in combination with a disilicate phase, is formed in the grain boundary phase of the sintered body, the oxidation resistance at 1500° C. and the flexural strength at 1400° C. can be improved, and that if the average grain size is controlled below 7 μm, especially below 5 um, the oxidation resistance and flexural strength at high temperatures can be improved.

EXAMPLE 5

A silicon nitride powder (having a BET specific surface area of 5 m$^2$/g, an α-structure ratio of 99%, an impurity oxygen amount of 1.0% by weight and an Fe content of 62 ppm), a rare earth element oxide powder and an SiO$_2$ powder were used as the starting powders. Incidentally, the silicon nitride powder was subjected to a washing treatment with hydrochloric acid to reduce the iron content.

These powders were mixed so that a composition shown in Table 5 was obtained, and the mixture was press-molded under 1 t/cm$^2$ and calcined at 1400° C.

A paste of a BN powder having a particle size of 1 to 5μm was coated in a thickness of 1 to 10 mm on the obtained molded body, and the molded body was heat-treated at 1350° C. under a reduced pressure of 0.2 Torr to remove impurities.

Then, a glass composed mainly of SiO$_2$ was coated in a thickness of 1 to 10 mm on the heat-treated molded body.

The so-treated molded body was placed in a hot isostatic pressure furnace and firing was carried out under firing conditions shown in Table 5.

Then, the glass-removed sintered body was subjected to ICP analysis to determine the iron content, and fourteen test pieces were cut out from each sample and according to JIS R-1601, the four-point bending flexural strength at room temperature, 1200° C. and 1400° C. and the increase of the weight by oxidation at 1400° C. were determined. With respect to each item, the average value was calculated.

With respect to each sample, eight flexural test pieces were examined to clarify the destruction source, and the number of test pieces where the destruction source was the abnormal growth of grains by iron was counted.

From the electron microscope photo of the sintered body, the average grain size of silicon nitride crystal grains was calculated.

The obtained results are shown in Table 5.

For comparison, molded bodies were prepared by using two starting materials differing in the iron content, firing was carried out under conditions shown in Table 5 by the gas pressure firing method, and the characteristics were evaluated in the same manner as described above.

TABLE 5

| Sample No. | Fe Content in Starting Material (ppm) | Si$_3$N$_4$ Content (mole %) | SiO$_2$/RE$_{23}$ RE molar ratio | Firing Conditions | | Fe Content in Sintered Body Flexural Strength (ppm) |
| --- | --- | --- | --- | --- | --- | --- |
| | | | | temperature(°C.) | Pressure(MPa) | |
| 1 | 19 | 90 | Er 7 | 1700 | 196 | 18 |
| 2 | 19 | 92 | Er 7 | 1700 | 196 | 20 |
| 3 | 43 | 92 | Er 11 | 1700 | 196 | 45 |
| 4 | 62 | 92 | Er 11 | 1700 | 196 | 60 |
| 5 | 19 | 96 | Er 7 | 1700 | 196 | 21 |
| 6 | 19 | 96 | Er 11 | 1700 | 196 | 21 |
| 7 | 19 | 88 | Yb 1.5 | 1700 | 196 | 19 |
| 8 | 19 | 88 | Yb 4 | 1700 | 196 | 21 |
| 9 | 19 | 88 | Yb 7 | 1700 | 196 | 19 |
| 10 | 19 | 88 | Yb 30 | 1700 | 196 | 19 |
| 11 | 19 | 90 | Yb 11 | 1700 | 196 | 21 |
| 12 | 19 | 92 | Yb 7 | 1700 | 196 | 19 |
| 13 | 19 | 92 | Yb 20 | 1700 | 196 | 21 |
| 14 | 19 | 96 | Yb 11 | 1700 | 196 | 21 |
| 15 | 19 | 92 | Y 7 | 1700 | 196 | 19 |
| 16 | 19 | 90 | Dy 7 | 1700 | 196 | 22 |
| 17 | 19 | 92 | Er 11 | 1850 | 0.9 | 18 |

TABLE 5-continued

| Sample No. | Flexural Strength(MPa) room temperature | 1400° C. | Number of Destruction Sources | Increase of Weight by Oxidation (mg/cm²) | Average Grain Size (μm) | RE₂O₃ | SiO₂ |
|---|---|---|---|---|---|---|---|
| 18 | 62 | 92 | Er 11 | 1850 | 0.9 | 58 | |
| 1 | 1240 | 620 | 0 | 0.08 | 5 | Er 1.25 | 8.75 |
| 2 | 1200 | 650 | 0 | 0.09 | 5 | Er 1.00 | 7.00 |
| 3 | 1080 | 570 | 2 | 0.07 | 6 | Er 0.67 | 7.33 |
| 4 | 930 | 540 | 7 | 0.07 | 4 | Er 0.67 | 7.33 |
| 5 | 1300 | 710 | 0 | 0.06 | 5 | Er 0.50 | 3.50 |
| 6 | 1220 | 670 | 1 | 0.07 | 4 | Er 0.35 | 3.67 |
| 7 | 1280 | 720 | 0 | 0.24 | 6 | Yb 4.80 | 7.20 |
| 8 | 1230 | 660 | 0 | 0.08 | 6 | Yb 2.40 | 9.60 |
| 9 | 1160 | 420 | 0 | 0.07 | 6 | Yb 1.50 | 10.50 |
| 10 | 1260 | 600 | 0 | 0.06 | 4 | Yb 0.39 | 11.6 |
| 11 | 1180 | 640 | 0 | 0.07 | 4 | Yb 0.83 | 9.17 |
| 12 | 1150 | 610 | 1 | 0.07 | 5 | Yb 1.00 | 7.00 |
| 13 | 1170 | 610 | 0 | 0.07 | 4 | Yb 0.38 | 7.62 |
| 14 | 1130 | 690 | 0 | 0.09 | 5 | Yb 0.33 | 3.67 |
| 15 | 1180 | 590 | 1 | 0.08 | 6 | Y 1.00 | 7.00 |
| 16 | 1170 | 580 | 0 | 0.08 | 5 | Dy 1.25 | 8.75 |
| 17 | 840 | 510 | 0 | 0.07 | 10 | Er 0.67 | 7.33 |
| 18 | 870 | 500 | 1 | 0.09 | 9 | Er 0.67 | 7.33 |

The electron microscope photo of the texture structure of the portion of abnormal growth of grains, acting as the destruction source, in the flexural test piece of sample 4 in Table 5 is shown in Table 5.

From the results shown in Table 5, the following can be seen.

Figure 3:
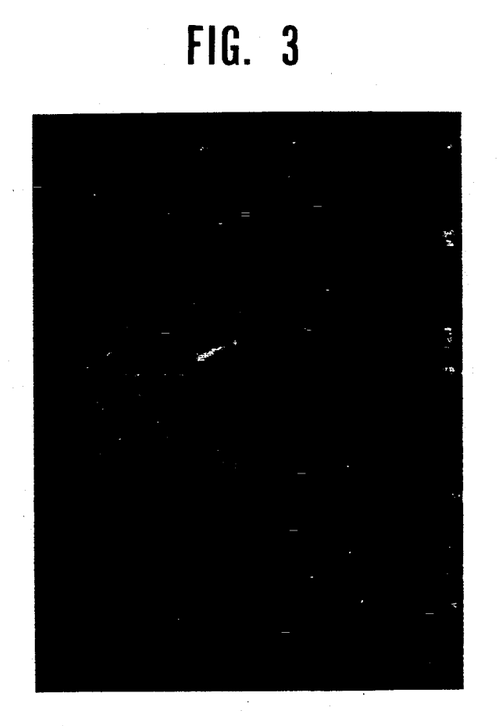
FIG. 3 is an electron microscope photo showing the texture of the portion of abnormal grain growth by iron.

In sample 4 where the iron content was higher than 50 ppm, Fe and Si were detected from the central part of the destruction source shown in FIG. 3, and abnormal growth of grains was caused around Fe and Si. Furthermore, dispersions of the characteristic values were large and the average values were small.

In most of samples of the present invention where the iron content was controlled below 50 ppm, intergranular destruction was caused, no abnormal growth of grains was observed, and the characteristics were good.

In sample 7 where the excessive oxygen/rare earth element oxide molar ratio was lower than 2, the oxidation resistance was poor, and in sample 10 where this molar ratio was higher than 25, the strength at 1400° C. was low.

In samples 17 and 18 obtained by firing the composition included within the scope of the present invention at a higher temperature under pressurization with nitrogen for comparison, abnormal growth of grains by iron was not found in the texture, the destruction source was the intergranular destruction, and the texture was hardly influenced by iron. However, in each sample, the crystal grain size was large and the characteristics were inferior to those of samples of the present invention.

We claim:

1. A silicon nitride sintered body comprising 70 to 99 mole% of silicon nitride, 0.1 to 5 mole% of a rare earth element oxide and from 0.2 to 25 mole% of silicon oxide and having a silicon oxide-to-rare earth element oxide molar ratio of from 2 to 25, wherein silicon nitride crystal grains have a fine acicular structure having an average particle major axis of up to 7 μm and an average aspect ratio of at least 3.

2. A sintered body as set forth in claim 1, wherein a crystal phase of silicon oxynitride ($Si_2N_2O$) is present in the grain boundary of the silicon nitride crystal.

3. A sintered body as set forth in claim 1, wherein a crystal phase of silicon oxynitride ($Si_2N_2O$) and a crystal phase of a disilicate ($RE_2O_3.2SiO_2$) are present in the grain boundary of the silicon nitride.

4. A sintered body as set forth in claim 1, wherein the silicon nitride sintered body contains less than 50 ppm level of iron (Fe).

5. A sintered body as set forth in claim 1, wherein the silicon nitride crystal grains have an average particle major axis of up to 7 μm and an aspect ratio of at least 5.

6. A sintered body as set forth in claim 1, which has a composition comprising 80 to 93.5 mole% of silicon nitride, 0.5 to 3 mole% of a rare earth element oxide and 6 to 20 mole% of silicon oxide and a silicon oxide-to-rare earth element oxide molar ratio of from 3 to 20.

7. A sintered body as set forth in claim 1, which has a flexural strength at least 1000 MPa at room temperature and a flexural strength at least 800 MPa at 200° C.

8. A process for the preparation of a silicon nitride sintered body having improved strength and toughness, which comprises molding into a compact a composition comprising 70 to 99 mole% of silicon nitride composed mainly of $\alpha$-$Si_3N_4$, 0.1 to 5 mole% of a rare earth element oxide and from 0.2 to 25 mole% of silicon oxide and having a silicon oxide-to-rare earth element oxide molar ratio of from 2 to 25, coating the surface of the molded body with a glass powder capable of forming a gas-impermeable seal, heating the coated molded body to form an impermeable glass seal on the surface of the molded body, compressing the obtained glass-sealed molded body under such conditions the majority of the silicon nitride in the molded body is left in the form of $\alpha$-$Si_3N_4$, to densify the molded body, and maintaining the densified molded body at a temperature of 1450° to 1730° C. to convert the silicon nitride in the molded body to $\alpha$-$Si_3N_4$.

9. A preparation process according to claim 8, wherein formation of the impermeable glass seal is effected while the temperature of the coated molded body is elevated to 1450° to 1730° C., and the compression for densification of the coated molded body is carried out so that the arrival pressure is at least 50 MPa and the pressure-elevating rate is at least 50 MPa/hr.

* * * * *